United States Patent Office 2,846,363
Patented Aug. 5, 1958

2,846,363

CATALYSTS FOR NAPHTHA REFORMING

Hillis O. Folkins and William L. Jacobs, Crystal Lake, and Vincent J. Brozowski, Mundelein, Ill., assignors to The Pure Oil Company, Chicago, Ill., a corporation of Ohio No Drawing. Application September 29, 1954
Serial No. 459,217

4 Claims. (Cl. 196—50)

This invention relates to new and improved reforming and aromatization catalysts and to the method of their preparation. The invention relates more specifically to new catalyst compositions and their method of preparation, which catalysts are particularly active for the production of aromatic hydrocarbons and high octane rating products in gasoline fractions by reforming or reactions conducted under dehydrogenation conditions in the presence of hydrogen.

Dehydrogenation or reforming reactions have been used to convert petroleum hydrocarbons into fractions containing substantial amounts of aromatic hydrocarbons using dehydrogenation-type catalysts. The aromatic fractions produced are important ingredients in the production of aviation gasoline and pure aromatics, as, toluene for special purposes. Also, catalytic cracking, hydrogenation, hydroreforming, and desulfurization processes as applied to hydrocarbons are well known. For these and related processes many catalytic agents have been employed with varying success including oxides or other compounds of metals such as Cu, Sn, Zr, Th, Ur, Ta, W, Ti, Pt, Co, Sc, Mn, V, Cd, Zn, Fe, Pb, Ni, Cr, etc., which compounds may be produced by an appropriate treatment of the metal chromates, chlorides, bromides, nitrates, sulfates, vanadates, and molybdates, or other suitable salts of these metals by methods well established in the art. Many of these catalytic agents exhibit superior activity only when supported on an inert carrier such as alumina, magnesium hydroxide, silica, zirconia, titania, thoria, or any combination of these carriers. It is taught in the art that various metal oxides or combinations of oxides of certain metals, such as chromium, molybdenum, and cobalt dispersed in alumina, form the best catalysts for cracking, dehydrogenation, etc. While a large number of these catalyst combinations have been found very effective for these reactions, especially the production of aromatic hydrocarbons which involves dehydrogenation of hydroaromatic naphthenes, dehydrocyclization of paraffins and olefins, and dehydroisomerization of non-hydroaromatic naphthenes, only a few of these catalytic mixtures are of sufficient activity and utility to be useful on a commercial basis.

It is known in the art that from about 2 to 12 percent of copper or zinc enhances the aromatization ability of activated alumina catalysts. Further, it is recognized the certain carefully prepared molybdenum oxide catalysts are the best so far developed for use on a commercial scale, and that only a few catalyst combinations are superior to molybdena-alumina catalysts for naphtha reforming reactions wherein higher boiling range naphthas of boiling ranges in the neighborhood of 240° to 425° F. are subjected to relatively severe conditions to obtain a highly aromatic product, i. e., one having a high octane number. This invention relates to the discovery of catalyst compositions which are superior to the molybdena-alumina catalysts for the purpose of producing high octane material and that such catalyst compositions can be prepared by incorporating certain very small amounts of copper in molybdena-alumina catalysts containing certain minimum amounts of silica.

Accordingly, it is a primary object of the invention to provide a new catalyst composition for aromatization reactions.

It is another object of the invention to provide a process for preparing a new reforming catalyst containing small critical amounts of copper and silicia.

Another object of the invention is to provide a process of preparing high octane gasoline from 240–425° F. boiling range naphthas.

Other objects and advantages of the invention will become apparent as the description proceeds.

The catalysts of the present invention are impregnated-type catalysts prepared by treating an adsorptive-type base with copper and molybdenum salts followed by calcining, which preparation is conducted in a certain sequence of steps. Although any adsorptive base may be used, alumina bases are preferred, especially those alumina bases naturally containing from 1 to 15 weight percent of silica. Thus, good catalysts can be prepared from those types of sorptive aluminas which in general have surface areas in excess of around 50 square meters per gram. Activated alumina resulting from either naturally occurring materials such as bauxites or those prepared synthetically may be used. Generally, however, it is preferred to use as the catalyst base, aluminas containing from 1–15 weight percent silica which have been prepared by synthetic methods. Alumina bases containing the desired amount of silica may be prepared by any of the well-known methods. As an example, an alumina may be prepared, containing the required amount of silica, by adding sodium silicate to a solution of an aluminum salt, such as aluminum sulfate and then precipitating the excess aluminum salt with a base such as ammonium hydroxide. Similarly, a sodium aluminate solution containing the required amount of sodium silicate may be neutralized by the addition of a sodium bicarbonate solution, followed by the removal of sodium ions.

Activated aluminas containing only small amounts of silica such as Alcoa activated alumina, grade F–10, Alcoa activated alumina R–2396 or others, must have their silica content augmented by the addition of sufficient silica to bring the content within the range of 1–15 weight percent, and preferably to an amount of at least 5.0 percent by weight.

The size and shape of the catalyst base will be determined by the manner in which the catalyst is to be employed. Desired physical forms may be obtained by adding the promoter to a granular, pelleted or fluid type activated alumina, or by processing the finished catalyst to obtain the required shape and size.

Activated aluminas of the grades F–10, R–2396 or the silica containing H-series as produced by the Aluminum Company of America are examples of alumina bases that may be used. The preferred alumina base comprises H–41 type alumina which contains about 5 percent by weight of $SiO_2$, 95 percent $Al_2O_3$ and less than 0.1 percent $Na_2O$. H–41 is a high surface area gel structure (around 300 square meters per gram) and consists mainly of gamma-type alumina. The content of alkali metal oxides of these alumina-base catalysts should be 0.1 weight percent or less. According to this invention about 5 weight percent silica is essential in the alumina base to produce the most active composite catalysts and must be incorporated in alumina bases devoid of silica. In these cases the silica may be added from sodium silicate solutions followed by removal of sodium content by ion exchange, by impregnation with ethyl ortho-silicate or by other suitable methods. The alumina base containing the added silica is then calcined prior to the addition of the copper and molybdenum salts.

The present invention resides in the discovery that the use of a very limited amount of copper, incorporated into the catalyst in reduced form and present either as the free metal or in combination with other catalyst components, greatly enhances the activity of activated alumina catalysts containing molybdenum present substantially as molybdenum dioxide.

Further, it has been found that although about 5 percent of copper with a silica-molybdena-alumina catalyst comprises a good combination, if about 0.25 to 1.5 weight percent of copper is used, the results are greatly improved. It has also been found that the presence of this very limited amount of copper is more pronounced in catalyst compositions containing the combination of molybdena on H-41 type aluminas containing silica than with combinations containing molybdena on F-10 type aluminas.

In order to illustrate the invention, various methods of catalyst preparation which were applied to a series of catalyst compositions will first be described:

*Method I.*—The carrier was heated in a furnace to about 600° C. for 3 hours and cooled to room temperature. Ammonium heptamolybdate in the proper proportion was then added to the carrier and the mixture was dried in an oven at 110° C. for 5 hours. The dried impregnated carrier was then calcined in an atmosphere of nitrogen at 600° C. for 5 hours. The catalyst mixture was finally heated for 2 hours at 500° C. in an atmosphere of hydrogen before use.

*Method II.*—The carrier was heated in a furnace to 500–650° C. and preferably to about 600° C. for three hours and cooled to room temperature. The carrier was then impregnated in the proper proportion with a solution of ammonium heptamolybdate and dried in an oven at 110° C. for 5 hours. To the dried impregnated carrier copper nitrate was added in the proper proportion by impregnation. The resultant material was again dried in an oven, maintained at 110° C. for 5 hours. The catalyst was then heated in an atmosphere of nitrogen at 600° C. for 6 hours to decompose the copper and molybdenum salts and finally reduced at 500° C. in an atmosphere of hydrogen to effect a more active and stable catalyst composition.

*Method III.*—The carrier was heated in a furnace to about 600° C. for 3 hours and cooled to room temperature. Cupric nitrate in the proper proportion was then added to the carrier and the mixture was dried in an oven at 110° C. for 5 hours. The dried impregnated carrier was then impregnated with ammonium heptamolybdate solution and again dried in an oven maintained at 110° C. for 5 hours. Calcination was carried out at 500–600° C. for a period of 6 hours in an atmosphere of nitrogen. Finally, the catalyst was subjected to heating in an atmosphere of hydrogen for 2 hours at 500° C.

*Method IV.*—The carrier was heated in a furnace to about 600° C. for 3 hours and cooled to room temperature. Cupric nitrate in the proper proportion was then added to the carrier and the mixture was dried at 110° C. for 5 hours. The dried, impregnated carrier was next calcined in air at 500° C. for 5 hours and cooled to room temperature. The calcined impregnated carrier was next treated with ammonium heptamolybdate in the proper proportion and again dried in an oven maintained at 110° C. for 5 hours. Following this the mixture was calcined in an atmosphere of nitrogen at 500–600° C. for 6 hours. Finally the catalyst was reduced in an atmosphere of hydrogen at 500° C. for 2 hours before use.

*Method V.*—The carrier was heated in a furnace to about 600° C. for 3 hours and cooled to room temperature. Cupric nitrate was then added in the proper proportion to the carrier and the mixture was dried in an oven at 110° C. for 5 hours. The mixture was next subjected to calcination at 500–600° C. for 6 hours in an atmosphere of nitrogen and final reduction with hydrogen at 500° C. for 2 hours prepared the catalyst for use.

In order to demonstrate the invention a series of experiments were conducted in which a 247°–414° F. naphtha having an octane number (F–1 method) of 40.5 was reformed at 250 p. s. i. g., using different catalyst combinations prepared in accordanc with the methods just outlined. The naphtha used in experiments 1–22 had the following inspection:

Origin of naphtha—247°–414° F. distillate cut, fractionated from East Texas and Coastal Crudes, i. e.

|  | Vol. percent |
|---|---|
| East Texas | 52 |
| Coastal B | 23.6 |
| Fannett-Stowell | 24.4 |
|  | 100.0 |

| | |
|---|---|
| ASTM boiling range, ° F | 247–414 |
| API gravity | 50.1 |
| Sulfur, weight percent | 0.01 |
| Mol weight | 128 |
| Naphthenes vol. percent | 41 |
| Aromatics do | 11 |
| O. N. (F–1) clear | 40.5 |

The naphtha used in experiment 23 had the following inspection:

| | |
|---|---|
| ASTM boiling range, ° F | 136–205 |
| API gravity | 72.8 |
| Sulfur, weight percent | 0.02 |
| Mol weight | 92 |
| Naphthenes | 27 |
| Aromatics | 2 |
| O. N. (F–1) clear | 63.6 |

The reforming reactions of the individual experiments shown on the table were all conducted under the same conditions with the exception of experiment number 23. In this latter experiment a naphtha having a boiling range of 136°–205° F. and an F–1 octane number of 63.6 was used and the reaction conducted at 952° F. with 95.7 percent liquid recovery, 3.3 vol. percent aromatics produced and a product having an octane number (F–1) of 64.4. On the basis of this data, by comparison with active catalyst on the same stock a projection was made as to performance with the heavier stock used in experiments 1–22.

The data in the table emphasize the improvement in the use of a very small amount of copper and shows in particular the greater effect of between about 0.5 to 1.5 weight percent of copper on molybdena—H–41 alumina, as compared with the effect of copper on molybdena—F–10 alumina. Thus a comparison of experiments No. 1 and No. 22 shows that copper has little or no effect if silica is not present. It will be observed that molybdena with H–41 alumina (experiment No. 2) at 912° F. gives an octane rating (F–1) of 92.5 while molybdena with F–10 alumina (experiment No. 1) at substantially the same temperature gives an octane number of only 85.4, indicating a considerable increase in catalytic activity. The addition of copper, particularly between 0.5 to 1.5 weight percent shows in addition a considerable increase in yield as a 90.0 octane number level of conversion. Comparison of experiments No. 2 and 3 giving 83.2 (90 ON yield) with experiments 4 and 5 giving 86.3

TABLE

*Reforming of 247°–414° F. naphtha*

| Exp. No. | Base | Percent Mo | Percent SiO$_2$ | Percent Cu | Method | Temperature, °F. | Liquid Recovery, Wt. Percent of Charge | Aromatics, Vol. Percent Product | Octane Rating, F-1 Clear | Yield at 90 O. N. |
|---|---|---|---|---|---|---|---|---|---|---|
| 1 | F-10 Alumina | 10 | 0 | | I | 911 | 86.0 | 46.4 | 85.4 | 82.1 |
| 2 | H-41 Alumina | 10 | 5.0 | | I | 912 | 81.0 | 52.0 | 92.5 | 83.2 |
| 3 | do | 10 | 5.0 | | I | 888 | 85.3 | 44.2 | 87.9 | 83.2 |
| 4 | do | 10 | 5.0 | 1.5 | II | 919 | 80.1 | 63.7 | 96.6 | 86.3 |
| 5 | do | 10 | 5.0 | 1.5 | II | 888 | 86.9 | 46.3 | 89.4 | 86.3 |
| 6 | do | 10 | 5.0 | 1.5 | II | 953 | 76.2 | 64.4 | 98.8 | 86.3 |
| 7 | do | 10 | 5.0 | 1.5 | III | 946 | 80.2 | 55.5 | 95.2 | 85.2 |
| 8 | do | 10 | 5.0 | 1.5 | III | 914 | 83.4 | 51.0 | 92.0 | 85.2 |
| 9 | do | 10 | 5.0 | 1.5 | III | 888 | 86.8 | 43.4 | 86.4 | 85.2 |
| 10 | do | 10 | 5.0 | 1.5 | IV | 944 | 78.3 | 61.9 | 96.2 | 85.0 |
| 11 | do | 10 | 5.0 | 1.5 | IV | 909 | 83.6 | 49.8 | 92.0 | 85.0 |
| 12 | do | 10 | 5.0 | 1.5 | IV | 889 | 86.5 | 44.4 | 88.5 | 85.0 |
| 13 | do | 10 | 5.0 | 0.5 | II | 937 | 76.6 | 56.6 | 96.0 | 85.8 |
| 14 | do | 10 | 5.0 | 0.5 | II | 902 | 86.4 | 50.8 | 92.4 | 85.8 |
| 15 | do | 10 | 5.0 | 0.5 | II | 906 | 87.1 | 52.8 | 94.0 | 85.8 |
| 16 | do | 10 | 5.0 | 0.5 | II | 883 | 88.5 | 41.5 | 85.1 | 85.8 |
| 17 | do | 10 | 5.0 | 5 | II | 915 | 80.8 | 53.0 | 94.2 | 84.8 |
| 18 | do | 10 | 5.0 | 5 | II | 885 | 88.1 | 45.0 | 86.5 | 84.8 |
| 19 | do | 15 | 5.0 | 1.5 | II | 917 | 82.5 | 49.7 | 93.1 | 84.7 |
| 20 | do | 15 | 5.0 | 1.5 | II | 887 | 86.0 | 46.5 | 88.0 | 84.7 |
| 21 | do | 7 | 5.0 | 1.5 | II | 909 | 83.6 | 43.9 | 88.0 | 84.7 |
| 22 | Al$_2$O$_3$ | 10 | 0 | 1.5 | II | 920 | 83.6 | 47.3 | 88.8 | 83.0 |
| 23 | H-41 Alumina | 0 | 5.0 | 1.5 | V | 912 | 96.0 | 13.0 | 48.0 | |

[1] Data projected from actual results on low boiling naphtha charge (63.6 O. N.) to results obtainable using the 247°–414° F. BR naphtha in experiments 1–23.

(90 ON yield) and experiments 13, 14, 15 and 16 giving 85.8 (90 ON yield) points up this improvement.

Further comparison of the experiments of the table shows that the method of catalyst preparation even when using the optimum concentration of molybdenum and copper has a pronounced effect on the activity of the resultant catalyst, especially its ability to promote aromatization. Comparison of experiments 4, 5 and 6 with 19, 20 and 21 shows that Method II is far superior to the other methods and that catalyst compositions prepared by this method exhibit the greatest activity and aromatization ability with the use of about 10 percent by weight of molybdenum.

The invention therefore also resides in the discovery of a catalyst composition comprising limited amounts of copper or copper in chemical composition incorporated with molybdenum dioxide into a base catalyst carrier composed of activated alumina containing a definite amount of silica, the procedure consisting of calcining an activated alumina silica carier at 600°–650° C. prior to impregnating, followed by impregnating the calcined alumina-silica first with molybdenum salt in proper proportions, drying to fix the molybdenum content, and finally impregnating with a copper salt in the concentration necessary for the final composition. The catalyst is then calcined at 500°–650° C., and preferably at 600° C., to simultaneously decompose the metallic salts. The final reduction step in the presence of hydrogen is for the purpose of further activating the catalyst and for the reduction of the copper and molybdenum oxides.

While the catalyst shows good reforming activity without this reduction step and is conditoned in reforming operation, the inclusion of this final reduction step in the catalyst preparation results in fixing the copper in its total or partially reduced form in the catalyst structure in such a manner as to increase the stability and overall activity of the catalyst. The major part of the molybdenum will be in the dioxide form and while it is thought that a substantial part of the copper is present as the free metal part of it is believed to be combined with the molybdenum oxide. While the surface chemistry of the catalyst composition is not known, it is evident that by employing the procedure and copper concentrations outlined, a catalyst of superior activity and aromatizing ability is obtained. Apparently, the inclusion of copper or copper and molybdena combination modifies the surface of the alumina-silica carrier in some way to effect greater activity for reforming reactions. The catalyst compositions of this invention are used to reform naphthas to produce hydrocarbons boiling in the gasoline boiling range having superior octane number by utilizing reforming temperatures in the range of about 800 to 1000° F. or about 426 to 537° C.

What is claimed is:

1. The process for the production of a catalyst having improved reforming and aromatization properties which comprises calcining an activated alumina carrier containing about 5 to 15 weight percent of silica at a temperature of about 500 to 600° C., impregnating the calcined activated alumina with a decomposable molybdenum salt in an amount equivalent to about 7.0 to 15.0 weight percent of molybdenum, drying the impregnated activated alumina at a temperature of about 110° C., impregnating the dried activated alumina with a decomposable copper salt in an amount equivalent to about 0.5 to 1.5 weight percent of copper, drying the impregnated activated alumina, calcining the activated alumina at a temperature of about 500 to 600° C. under conditions whereby the molybdenum and copper salts are converted to metal oxide forms and subjecting the calcined mixture to heating in an atmosphere of hydrogen at 500° C.

2. The process in accordance with claim 1 in which each of said drying and calcining steps are carried out for about 5 hours.

3. The process in accordance with claim 1 in which said activated alumina contains 5.0 weight percent of silica and is impregnated with sufficient amounts of said decomposable molybdenum and copper salts so that the finished catalyst contains 10.0 weight percent of molybdenum and 1.5 weight percent of copper.

4. The process of reforming a naphtha to produce hydrocarbons boiling in the gasoline boiling range having superior octane numbers which comprises subjecting a naphtha to reforming at an elevated temperature in the presence of a catalyst comprising about 7.0 to 15.0 weight percent of molybdenum and about 0.5 to 1.5 weight percent of copper on an activated alumina carrier containing about 5 to 15 weight percent of silica, said catalyst being prepared by calcining said activated alumina carrier at a temperature of about 500 to 600° C., impregnating the calcined activated alumina with a decomposable molybdenum salt in an amount equivalent to about 7.0 to 15.0 weight percent of molybdenum, drying the impregnated activated alumina at a temperature of about 110° C., impregnating the dried activated alumina with a decomposable copper salt in an amount equivalent to about 0.5 to 1.5 weight percent of copper, drying the impregnated activated alumina, calcining the activated alumina at a temperature of about 500° to 600° C. under conditions whereby the molybdenum and copper salts are converted to metal oxide forms and subjecting the calcined mixture to heating in an atmosphere of hydrogen at 500° C. and recovering a reformed product.

References Cited in the file of this patent

UNITED STATES PATENTS

| | | |
|---|---|---|
| 2,437,531 | Huffman | Mar. 9, 1948 |
| 2,498,709 | Roberts et al. | Feb. 28, 1950 |
| 2,518,295 | Denton et al. | Aug. 8, 1950 |
| 2,726,195 | Fleck et al. | Dec. 6, 1955 |